Feb. 15, 1927.
H. A. DENMIRE
1,617,705
TIRE MAKING MACHINE
Filed Feb. 25, 1920    2 Sheets-Sheet 2
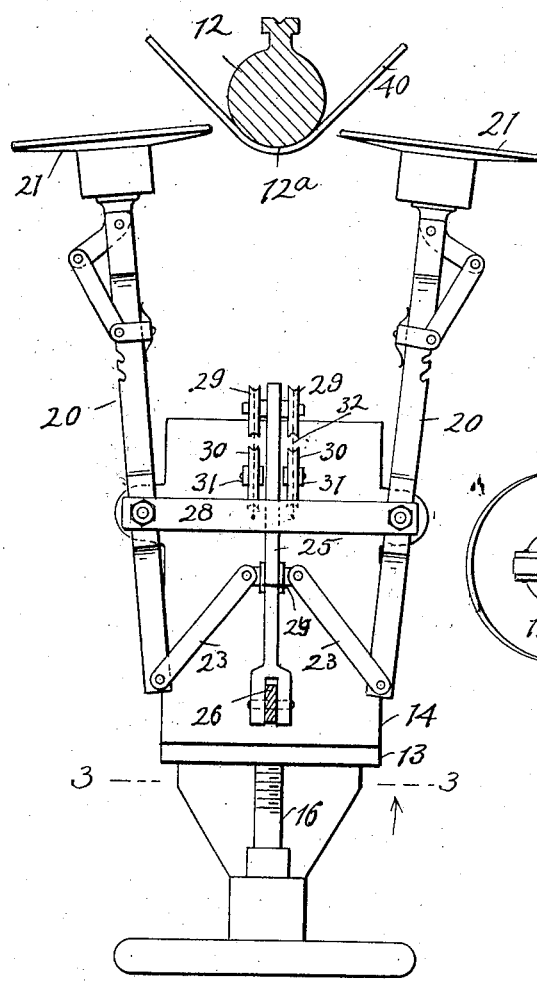
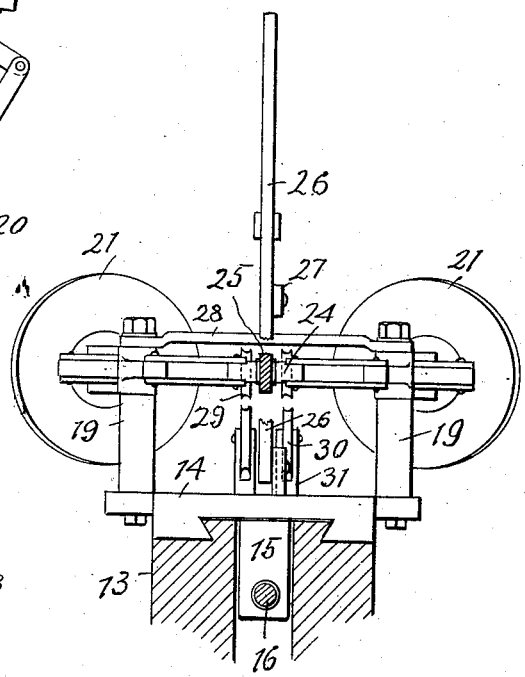
Inventor
Harold A. Denmire
by
Thurston Kwis & Hudson
attys Patented Feb. 15, 1927.

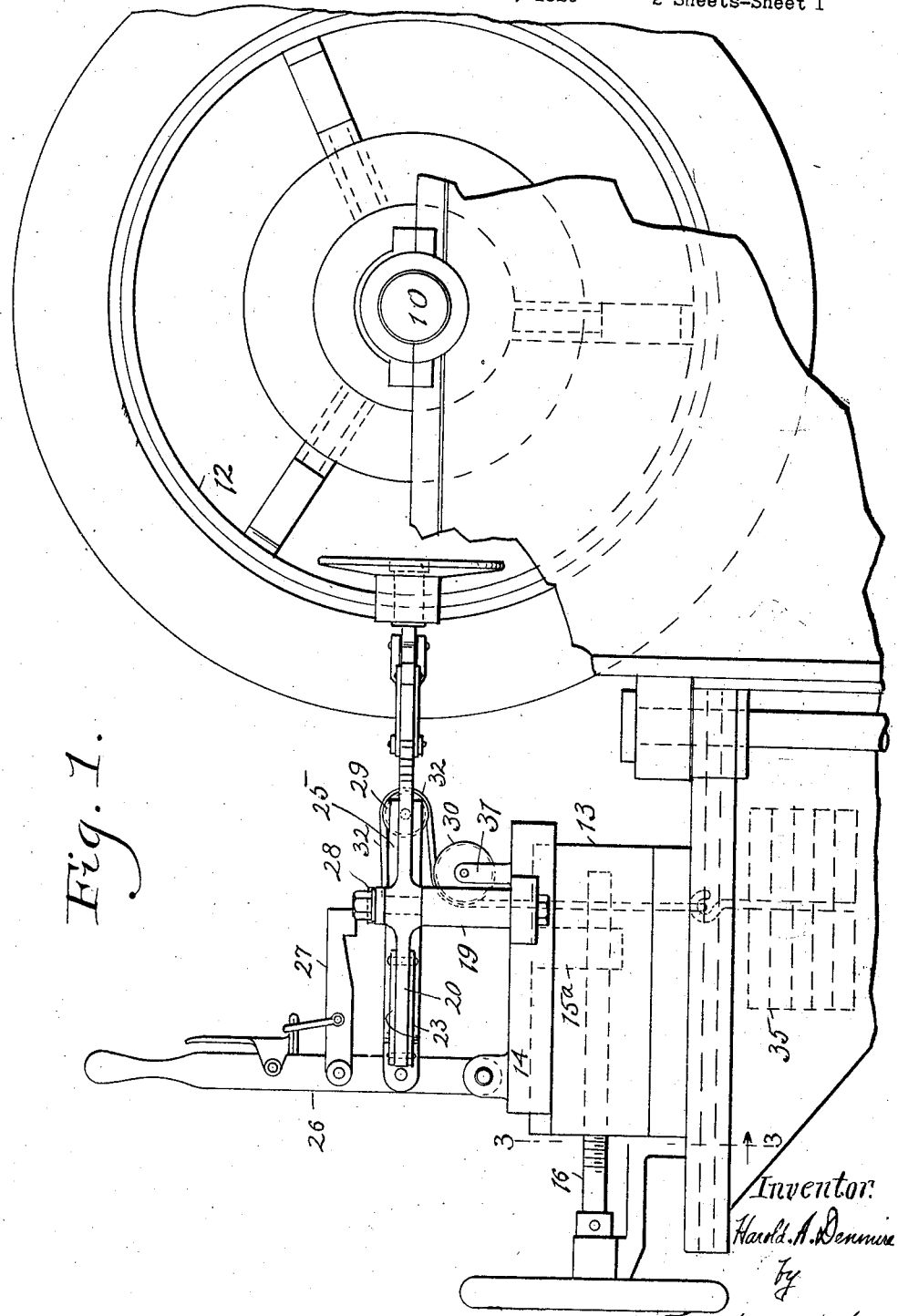

1,617,705

UNITED STATES PATENT OFFICE.

HAROLD A. DENMIRE, OF AKRON, OHIO, ASSIGNOR TO THE GENERAL TIRE & RUBBER COMPANY, OF AKRON, OHIO, A CORPORATION OF OHIO.

TIRE-MAKING MACHINE.

Application filed February 25, 1920. Serial No. 361,161.

This invention relates to certain improvements in tire making machines which enables a relatively unskilled operator to make better and more uniform tires and by the expenditure of less physical effort than is possible with the known tire making machines.

The invention consists in the construction and combination of parts shown in the drawing and hereinafter described and pointed out definitely in the appended claims.

In the drawing, Fig. 1 is a side view of the present invention applied to a tire making machine embodying the present invention; Fig. 2 is a plan view of the same mechanism; Fig. 3 is a vertical sectional front elevation of the machine in the plane of line 3—3 on Fig. 1.

The machine includes a rotatable shaft 10 carrying means through which an annular core 12 may be secured to it in such position that the axis of the core and the axis of the shaft shall be coincident. The machine also includes a bed plate 13 on which is mounted a slide 14 which slide is movable toward and from the core in the direction at right angles to the axis thereof. To so move the slide, a feed screw 16 is mounted on the bed, and screws through a lug 15 on the slide.

Two levers 20 are pivoted on vertical posts 19 fixed to slide 14. These levers extend from their pivots to opposite sides of the core. A stitching wheel 21 is mounted to rotate freely on the rear end of each of these levers, and by means which permit an adjustment of the wheel. To the extent above referred to the machine shown is like most of the machines in common use.

In using such machines layers of friction fabric 40 are stretched on to the core, that is to say, the part of the fabric layers which engage the crown 12ª are stretched. The sides of the strip are then forced down against the sides of the core, while the core and the shaft which supports it are rotating, by means of the stitching wheels 21 which when the operation is begun engage the fabric strip on opposite sides of the crown of the core and close to said crown. And while the core and shaft are rotating the slide 14 is moved toward the core, and means are employed to cause the stitching wheels to press the sides of the fabric strip down against the sides of the core.

The present invention concerns the means by which the stitching wheels are made to press uniformly and with the desired degree of pressure, without drawing on the skill or strength of the operator so that his hands are left free to control the required movements of the slide.

Toggle links 23 are respectively pivoted to the front ends of these levers and extend rearward and toward each other from their pivots; being at their front ends pivotally connected with a cross rod 24 which is fixed to a bar 25. This bar is movable endwise toward and from the core in a direction at right angles to the axis of the core. A retracting lever 26 pivoted to the slide is likewise pivoted to the rear end of this sliding bar. By swinging this lever rearward the bar may be moved toward the core with the result of so operating the toggle links 23 that the front ends of the levers 20 will be spread apart. This lever 26 carries a latch 27 which is adapted to engage over a fixed cross bar 28 secured on the posts 19 above the levers 20, and thereby prevent such a forward movement of the lever 26 as will swing the rear ends of the levers toward each other and the interposed core.

Two sheaves 29 are mounted on the rear ends of the bar 25. Two other sheaves 30 are mounted on standards 31 carried by the slide. Two cords or cables 32 are fixed to the bar 28, and are then carried around the sheaves 29 and 30 as shown in Fig. 1. On the depending ends of these cables a weight 35 is suspended. The action of the weight through the cables is to draw the sliding bar 25 foward, which motion acting through the toggle links 23 spreads the front ends of the levers 20 apart, and consequently swings their rear ends, carrying wheels 21, toward the interposed core, and causes the stitching wheels 21 to engage with uniform pressure against the sides of the fabric strips to force them down against the sides of the rotating core. Heretofore the degree of pressure of the stitching wheels upon the fabric strips has been regulated by the operator by his manipulation of a lever substantially like lever 26. In the present case, however, the desired uniformity in pressure may be more effectually attained by the use of the weight in the manner stated. The lever 26 has no function except that, when the strips have been stitched in against the core, the upper end of this lever is pushed forward whereby the stitching wheels are moved apart until the latch 27 is caused to engage the cross bar 28 to hold them apart and prevent the weight from acting effectively.

In the practical use of a tire making machine in which the present invention is embodied, the stitching mechanism is locked in the inactive position by the engagement of the latch 27 with the cross bar 28. When it is desired to have this stitching mechanism perform the functions for which it is provided, the operator by turning the feed screw moves the slide 14 to the proper position; and then the lever 25 is unlatched. Thereupon the weight 35 causes the rear ends of the levers 20 to swing toward each other carrying the stitching wheels into operative position such that they press the fabric strip down upon the tire core as the core is being rotated. All the operator has to do is to progressively move the slide rearward by turning the slide feed-screw until the entire fabric strip has been pressed against the core. The pressure of the stitching rollers is always rendered uniform and adequate by the action of the weight. Of course the operator may, if occasion requires, supplement or modify the action of the weight by force applied by him to the lever 25, but commonly this is unnecessary.

It will be observed that as each cable 32 is fixed at one end and passes over the floating pulley 29 the effective force exerted by the weight 35 is doubled and therefore only one-half the weight is required here over that necessary in former constructions where the weight operates directly upon the arm. In this manner the total weight carried by the slide 14 is decreased. It will also be observed that the weight operates upon a single or common actuating member 25, so that its force is evenly distributed to the two stitcher carrying arms.

Having described my invention, I claim:—

1. In a tire making machine containing means for rotatably supporting an annular tire core, the combination of a slide movable toward and from said core, two levers pivoted on said slide in position such that their rear ends may lie on opposite sides of said core, stitching wheels mounted on the rear ends of said levers, a weight, and means through which the weight may cause the simultaneous and equal movement of the rear ends of said levers toward each other and the interposed core, and a latch to prevent the weight induced movement of said levers.

2. In a tire making machine containing means for rotatably supporting an annular tire core, the combination of a slide, two levers pivoted thereon in position such that their rear ends may lie on opposite sides of said core, stitching wheels rotatably mounted on the rear ends of said levers, a bar located between the levers and movable endwise toward and from the core, toggle links which are pivoted respectively to the front ends of said levers and to said intermediate bar, a sheave mounted on the rear end of said bar, a sheave mounted on the slide, a cable connected to the slide and extending over said two sheaves, and a weight suspended from a depending end of said cable, a lever pivoted to the slide and pivotally connected with the front end of said intermediate bar, a latch carried by said lever, and a bar fixed to the slide for engagement by said latch.

In testimony whereof, I hereunto affix my signature.

HAROLD A. DENMIRE.